Dec. 3, 1968  W. S. HOOCK  3,413,967
FUEL BLOCK HEATER
Filed Nov. 20, 1967
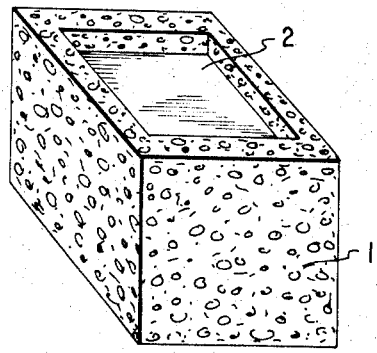
INVENTOR
WILLIAM S. HOOCK
BY McLean, Morton & Boustead
ATTORNEYS 
United States Patent Office 3,413,967
Patented Dec. 3, 1968

3,413,967
FUEL BLOCK HEATER
William S. Hoock, Flossmoor, Ill., assignor to Sinclair Research, Inc., New York, N.Y., a corporation of Delaware
Continuation-in-part of application Ser. No. 528,417, Feb. 18, 1966. This application Nov. 20, 1967, Ser. No. 684,161
6 Claims. (Cl. 126—59.5)

ABSTRACT OF THE DISCLOSURE

A fuel block heater composed of a container made from porous light weight aggregate, e.g. expanded shale, and a binder, e.g. silicate or portland cement, having disposed therein a normally solid hydrocarbon wax.

---

This application is a continuation-in-part of application Ser. No. 528,417, filed Feb. 18, 1966, now abandoned.

This invention relates to solid fuel blocks and their use as a source of heat for a variety of applications. More particularly, this invention concerns the combination of a wax fuel with a particular container to produce a heater especially useful for frost or freeze protection and for other purposes.

There is a need in many parts of the country for a means for supplying heat to citrus groves, fruit orchards, or vegetable farms to protect the crop against damage caused by frost or freezing. Three actions that may be taken in preventing crop damage due to frost and freezing involve the conservation of heat, mixing or stirring the air and the addition of heat. One of the most effective ways to protect crops from cold weather is to conserve heat by covering the area to be protected with cloth, paper, wood, glass, lathes, earth, brush, water flooding, etc. However, this procedure has proven to be impractical, especially in protecting large acreages. In any case, the degree of protection is limited and the labor cost is almost prohibitive. Irrigation and spraying with water has also proven to be undesirable. Although spraying crops with water does afford some protection, if it is discontinued before the air temperature rises above the danger point, ice may form on the trees causing substantial damage. Orchard irrigation may cause temperatures to rise about 1.5° F., but this is usually insufficient to protect crops or trees.

Since the air temperature 40 feet away above an orchard may be as much as about 7 to 10° F. higher than at 5 feet above the ground, stirring the air with fans has often proved to be beneficial. These fans or wind machines usually consist of a tower equipped with a single propeller driven by an electric motor, gasoline or diesel engine. However, wind machines are not very effective against even a moderate, natural air drift. Further, if conditions for heavy frost or freezing exist, there is little or no increase in air temperature with elevation and, consequently, there is no warm air to mix with the cold surface air.

Most people who protect their crop against damages by freezing or frost do so by adding heat through the burning of various fuels. The addition of heat in this manner is based upon the principle of temperature inversion. On a clear, calm night there is a relatively thin layer of cold air near the ground and a gradual increase in air temperature up to a height of 300 to 800 feet. Hot gases from the burning fuel mix rapidly with the surrounding cold air to give a slightly increased ambient air temperature which rises slightly and acts as a roof over the area to be heated to retain the subsequently heated air.

One of the most important single factors in crop protection by heating is the amount of air movement near the ground. When the air is calm, a minimum number of heaters will raise the surface temperature appreciably. Air in motion steadily carries the heat away and a greater quantity of fuel must be consumed to obtain the same effect on surface temperature.

The addition of heat can be accomplished through the burning of either solid fuels or oil. Solid fuels include briquettes of coal or carbon, wood, oil saturated wood shavings, baled straw, automobile tires and a mixture of coal dust, asphalt, sawdust, niter and the like. Many of these items, however, are costly and the supply limited. Also, these fuels often give a large amount of soot and odor, and considerable labor is required for their use. Consequently, oil is a favorite fuel for frost protection. Oil used for this purpose varies from bunker grade marine diesel fuel (about 27° API) to highly refined distillates of say 37–38° API. In certain parts of the country people are restricted to burning only distillate fuels in a "return stack type heater," or other approved stoves. Fruit growers not affected by these requirements still use crude oil, crankcase drainings and other inexpensive fuels. However, these cheaper fuels cause smoke which deposits an oil soot on the crop thus impairing its marketability.

Because of the expense, inadequate heating, smoke and other problems associated with crop heating systems, the industry has tried to develop improved means for protecting crops from frost and freezing, as illustrated by U.S. Patents 1,763,516; 2,435,520; 2,531,821; and 3,105,484. The devices of all of these patents use a liquid fuel such as an alcohol, fuel oil such as kerosene, or any relatively inexpensive oil or other liquid material. These fuels have the inherent limitations of being difficult to handle and burning very rapidly, often with a large amount of smoke. Orchard heater smoke has little or no influence on temperature and many, in fact, have a deleterious effect if it deposits sooty residues on citrus fruits or becomes obnoxious to the neighborhood.

U.S. Patent No. 1,763,516 discloses a heating device formed of porous material, such as limestone or fire clay, containing two separate compartments for storing liquid fuel, one of which is filled with kerosene or a similar inflammable oil, and the other with a heavy oil such as a crude oil or a heavy fuel oil. In operation, kerosene penetrates to the outside of the porous container where it burns and the heat of combustion causes the heavier liquid oil to penetrate to the outside of the container and burn. As can be readily seen, this heater is very complicated in operation, produces undesirable smoke, is difficult to extinguish once the burner has been started and is expensive to produce and maintain.

U.S. Patent No. 2,435,520 shows a flare composed of a porous ceramic material, the central portion of which acts as a wick for the liquid fuel contained therein. As can readily be observed, the small burning surface would have limited heating capacity and the fuel would be dissipated in a relatively short time. Also, it would appear that the heating capacity of the device would be continually decreased as the level of the fuel recedes thereby reducing the surface area of the wick exposed to the liquid fuel. Both U.S. Patents Nos. 2,531,828 and 3,105,484 disclose heaters consisting of a reusable container filled with an absorbent material impregnated with liquid fuel. The former patent uses asbestos fiber type absorbent material, whereas the latter patent uses absorbents such as rock wool, mineral wool, glass wool, vermiculite, etc. Upon ignition, all of the fuel would burn simultaneously causing a rapid use of the fuel and also making extinguishing of the fuel difficult. Thus, it is apparent that an improved heating device is needed which is cheap and easy to operate and produces sufficient, essentially smokeless heat for a desired period of time.

The heating device of the present invention is a fuel block composed of a normally solid hydrocarbon wax encased in an open top container. One embodiment of the fuel block heater of the invention is shown in perspective view in the drawing, wherein normally solid hydrocarbon wax 2 is disposed in porous container 1. By using the wax fuel material in a container which functions as a wick to burn the fuel contained therein, a heater has been produced which substantially satisfies the needs of the fruit and vegetable industry, that is, to protect crops against damage caused by frost and freezing. The wicking action of the container is essential to maintain burning of the fuel over an extended period of time, especially when there is appreciable air movement across the surface of the block. Thus, the wax-container interface at the upper surface of the wax forms a stable flame source that maintains combustion even when a substantial wind is present.

One of the features of the present invention is the relatively easy ignition and extinguishing properties of the fuel block. The novel wicking action of the fuel container insures ready ignition and the flame can be extinguished by smothering and may be relit at any time. To further facilitate relighting, it may often be advantageous to incorporate a wick-like igniting feature in the fuel block. The ignitor is generally freely exposed to the fuel and can extend from approximately the bottom of the fuel to the upper surface of the fuel. The ignitor may be located at the side of the container where it cooperates with the wicking action of the container walls, or the ignitor may extend across the block for instance, in a criss-cross shape to all four corners. Any material having sufficient strength and rigidity to remain upright in the fuel block both when dry and when saturated with hot fuel and capable of absorbing sufficient amounts of fuel can be employed as an ignitor in the fuel block of the present invention. Suitable materials include a pressed pulp paper material, rock wool, mineral wool, glass wool, etc.

In further describing the features of the fuel block heaters of the present invention it is felt desirable to state the requirements of the industry and show how the heater of the present invention meets and satisfies these essential requirements. Thus, the fuel block heaters of the present invention can be employed in various situations where heat is necessary, and is especially useful to protect vegetables, citrus crops, and trees from damage caused by frost or freezing. In protecting trees from frost it has been determined that three fuel blocks or heaters per tree dissipating a total of 45,000 to 75,000 b.t.u.'s per hour or approximately 15,000 to 25,000 b.t.u.'s per hour per block is advantageous for increasing the temperature around a tree about 9° F. in a 12 foot area with a 0 to 5 miles per hour wind. One prototype fuel block of the present invention had outside dimensions of 11 inches square and 10 inches in height, and walls ¾ inch thick, and contained about 20 pounds of fuel having a total b.t.u. content of about 400,000. This block can provide about 50,000 b.t.u.'s per hour over about an 8 hour period. Another prototype fuel block had outside dimensions of 9¼ inches square and 7⅝ inches in height with ¾ inch walls and contained 10 pounds of fuel and is capable of producing 20,000 b.t.u.'s per hour for about 8 to 10 hours.

It is also desired that the heater or fuel block give off a relatively even b.t.u. output as it burns down and thus most advantageously has a horizontal cross-section which is essentially constant. The heat dissipation of the fuel blocks of the present invention can therefore be substantially uniform since the fuel and air supply are essentially constant throughout the burning period for a uniform air movement. The blocks are particularly effective in areas of the country where there is no temperature inversion and thus no warm air roof to hold the heat near the ground. In these situations it is important that the heaters deliver relatively constant heat from ignition until the flame is extinguished. It is also essential that the heaters be able to withstand the climatic conditions which exist during that period of time when the heaters are being used, generally, throughout the frost and freezing months. The fuel blocks of the present invention are substantially unaffected by the extremes of temperature conditions. In achieving the necessary b.t.u. requirements, the fuel often burns with about a 12 to 15 inch flame and with as little smoke as possible. The fuel blocks of the present invention burn with flame heights which depend on the surface area of the particular fuel block being utilized, and may often extend about 12 to 18 inches or more in 10 to 22 miles per hour winds with the fuel assuring minimum smoke from the burner.

The solid fuel block heaters of the present invention are relatively inexpensive to produce and can be properly sized to meet the necessary heat output required depending upon their particular use. Frequently, the blocks expose an upper wax surface of at least about 0.15 square foot and may be sized up to about 5 square feet with convenience in handling being maintained; however, blocks of larger fuel cross-sectional dimensions may be made. The blocks can be stacked without any danger of spillage and can be stored indefinitely without any serious deterioration in the burning qualities of the burner. The fuel used is not subject to spontaneous combustion and if storage temperatures rise above the melting point of the fuel, no difficulty would be encountered execpt possibly spillage problems if it were necessary to move the containers at that particular time. In another advantageous feature of the fuel blocks of the present invention, when the container is made of a soil conditioning material, such as, for example, vermiculite, the container can be broken up and plowed under after the fuel has been burned.

The materials used for making the containers of the present invention are light weight predominantly inorganic aggregates with a density up to about 90 lbs./ft.$^3$, preferably no greater than about 60 lbs./ft.$^3$. The light weight of the aggregates can be achieved by screening out the fines to reduce the weight and using aggregates with a high porosity. The aggregate preferably passes an 8 size screen (Tyler). The porosity is contributed both by the pores of the aggregate and the space between aggregate particles. Hence, porosity may be varied by the aggregate choice and by screen size selection. The aggregates include such light weight materials as perlite, pumice, scoria tuff, cinders, expanded shale, expanded slag, expanded clay, expanded slate, exfolated vermiculite and mixtures thereof, with expanded shale or exfoliated vermiculite being particularly advantageous. Exfoliated or expanded vermiculite is produced when sheets of mined vermiculite are exposed to temperatures of about 2000° F. which removes a substantial amount of moisture causing the sheets to separate and move apart. At the same time the granules of vermiculite expand 12–15 times their original size forming thousands of tiny cells of dead air. There are several advantages of containers made from light weight aggregates as compared with those composed of metal and other materials previously suggested in the prior art. These light weight aggregates are inexpensive and therefore can be discarded after burning the fuel or in some instances may be crushed and used as a soil conditioner. The containers are also non-combustible, highly resistant to extreme temperature conditions, and as an essential feature possess a low bulk density, permanently porous structure which acts as a wick in cooperating with the solid fuel to assure relatively constant heat from ignition until the flame is extinguished. The fuel block containers can be formed by compression and thus their porosity may depend to a considerable extent on formation pressures. The side walls and bottom of the container may frequently have thicknesses of about ¼ to 2 inches, preferably ½ to 1 inch.

A binder material is added to the light weight aggregate of the present invention before the container is formed, and is especially useful in molding the containers. Examples of suitable binders include sodium silicate, Portland cement, dextrin, polybutadiene resins, xylene-formaldehyde resins, shale oil, etc. The preferred binders are sodium silicate and Portland cement. While Portland cement has a cost advantage over all the other binders, it may have a weight limitation. The use of sodium silicate as a binder gives a container having an appreciable weight advantage over one made with cement. This weight difference is exemplified by comparing the following two formulae:

| No. | Material Required for 3-Gallon Container | Weight, pounds |
|---|---|---|
| 1 | Exfoliated Vermiculite | 2.1 |
|   | Sodium Silicate | 5.8 |
|   |   | 7.9 |
| 2 | Exfoliated Vermiculite | 2.1 |
|   | Portland Cement | 6.0 |
|   | Water | 4.3 |
|   |   | 12.4 |

Another mixture suitable for forming the container has about 40 weight parts of expanded shale, 15 weight parts of Portland cement and 11 weight parts of water.

In producing the present containers, a volume ratio of light weight aggregate to binder of about 2:1 to 14:1 may often be used, often about 5 to 10:1. The containers of the present invention can be formed by compressing the container material mixed with the desired binder until a container of desired strength is obtained, often at least about 1000 p.s.i. The curing temperature may vary depending upon which binder is used. For example, if sodium silicate is selected as the binder, a curing temperature of about 600° C for about thirty minutes gives a desired container which has a compressive strength of about 200 p.s.i. In using cement as the binder material for the container, it was found desirable to cure under high humidity conditions, for example, using a steam kiln for about 8–16 hours or longer at a temperature of about 140 to 190° F. to produce a strong container having a compressive strength of at least about 1000 p.s.i. The binder material selected for use with the light weight aggregate in forming the container of the present invention may depend on how the burner is to be used and the purpose for which it is used. For example, if a light container is desired, sodium silicate would serve as a better binder over say, Portland cement. If the fuel block is to be exposed to various weather conditions then a waterproofing agent may be added; however, if the burner is used to supplement indoor heating waterproofing would not be necessary.

To prevent possible leakage due to heat and moisture penetration from rains, etc. during outdoor storage, the outside of the container may be sealed with an appropriate sealer, e.g. Bondex [1], Loxon [2], and Tamtex [3], Portland cement paste, latex paint, acrylic latex, siliceous-type sealants, polyesters, and other masonry sealants.

[1] Bondex—a product of the Reardon Co. which contains in weight percent silicon oxide 16.5%, aluminum oxide 4.9%, calcium oxide 67.6%, sodium chloride 3.0%, titanium dioxide 3.0%, tinting materials (less than) 5.0%.
[2] Loxon—a product of the Sherwin-Williams Co. As a masonry surfacer it contains in weight percent calcium carbonate 6%, silica and silicates 57%, synthetic latex solids 11%, water 26%. As a masonry paint it contains in weight percent titanium dioxide 22%, silica and silicates 12%, synthetic latex solids 18%, volatile thinner (water) 48%.
[3] Tamtex—a product of Tamms Industries Co. which is composed of a mixture of Portland cement and lime.

A damper which can freely nest in a recess designed into the top of the fuel block can be provided to facilitate controlling or extinguishing the flame. A cover may also be provided for the open top of the fuel block. The cover may be composed of a water-resistant cellulose material suitable in strength to withstand the abuse of storage and resistant to mildew, bacterial attack, insects, etc.

The fuels which are used in making the solid fuel blocks of the present invention are generally those which melt at a temperature high enough so that they will not flow out of the container if the blocks are stored on their side at summer temperatures. These fuels in general are normally solid waxes and include predominantly waxy hydrocarbon products melting above say about 100° F., and thus include fully refined paraffin or microcrystalline waxes. The fuels, although consisting substantially of wax, may contain a minor amount, say up to about 30% or more by volume of oil. A typical fuel which is obtained from light and medium slacks is foots oil which melts between about 115 and 125° F. A typical paraffin wax has a specific gravity (API) of about 34, a viscosity (SUS at 210° F.) of about 53, a melting point (ASTM) of about 141° F., and a percent oil content of 22.3.

The usefulness of this type of heater is not restricted to orchard use and general crop use such as in vineyards, berry farms, vegetable farms and other field crops, but also finds application in construction work, winter resort areas such as ice skating rinks and ski slopes, various indoor applications and many other heating applications. The heaters of the present invention can also be used as standby equipment to supplement existing heating facilities.

It is claimed:

1. A fuel block heater consisting essentially of a normally solid hydrocarbon wax and a porous container in which said wax is disposed, said container consisting essentially of a light weight aggregate with a density up to about 90 lbs./ft.$^3$ and a binder material, in an aggregate to binder volume ratio of about 2:1 to 14:1, said container walls serving as a wick for burning said fuel.

2. The heater of claim 1 wherein the light weight aggregate is expanded shale and the binder material is selected from the group consisting of sodium silicate and Portland cement.

3. The heater of claim 1 wherein the light weight aggregate is exfoliated vermiculite and the binder material is selected from the group consisting of sodium silicate and Portland cement.

4. The heater of claim 1 wherein an ignitor is disposed in the hydrocarbon fuel and extends from approximately the bottom of the fuel to the upper surface of the fuel.

5. The heater of claim 1 wherein the aggregate to binder volume ratio is about 5:1 to 10:1.

6. The heater of claim 1 wherein the light weight aggregate has a density up to about 60 lbs./ft.$^3$.

References Cited

UNITED STATES PATENTS

| | | | |
|---|---|---|---|
| 1,960,288 | 5/1934 | Sherman | 67—22 X |
| 2,671,330 | 3/1954 | Ajello | 67—21 |
| 2,804,132 | 8/1957 | Mallory | 158—96 |
| 2,895,544 | 7/1959 | Parsons | 158—96 X |
| 3,105,484 | 10/1963 | Goff | 158—96 X |

CHARLES J. MYHRE, *Primary Examiner.*